US007012791B2

(12) United States Patent
Kikuchi

(10) Patent No.: US 7,012,791 B2
(45) Date of Patent: Mar. 14, 2006

(54) CONSTANT-VOLTAGE POWER SUPPLY UNIT

(75) Inventor: Hiroki Kikuchi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 10/968,311

(22) Filed: Oct. 19, 2004

(65) Prior Publication Data

US 2005/0083027 A1 Apr. 21, 2005

(30) Foreign Application Priority Data

Oct. 21, 2003 (JP) ............................ 2003-360184

(51) Int. Cl.
*H02H 7/00* (2006.01)
*G05F 1/573* (2006.01)

(52) U.S. Cl. ........................................ 361/18; 323/277

(58) Field of Classification Search .................. 361/18, 361/93.1, 93.2, 93.7; 323/275, 276, 277
See application file for complete search history.

(56) References Cited

U.S. PATENT DOCUMENTS 4,593,338 A * 6/1986 Takeda et al. ................ 361/18
5,859,757 A * 1/1999 Hanafusa et al. ........... 361/100
5,942,881 A * 8/1999 Okada et al. ............... 323/277
6,028,420 A * 2/2000 Benes ........................ 323/276
6,201,674 B1 * 3/2001 Warita et al. ................. 361/18
6,236,194 B1 * 5/2001 Manabe et al. ............. 323/274
6,683,765 B1 * 1/2004 Kanamori .................... 361/18

FOREIGN PATENT DOCUMENTS

JP 08-044441 2/1996
JP 2001-298332 10/2001
JP 2002-258954 9/2002
JP 2002-304225 10/2002
JP 2003-186554 7/2003

* cited by examiner

*Primary Examiner*—Adolf Berhane
(74) *Attorney, Agent, or Firm*—Hogan & Hartson LLP

(57) ABSTRACT

A constant voltage supply unit having a high-speed load response, equipped with a fold-back type over-current protection function in which an output current detection voltage indicative of the output current is compared with the sum of a feedback voltage indicative of the output voltage and an offset voltage. The over-current protection function has a characteristic that the offset voltage is inversely proportional to the output-current detection voltage, so that the offset voltage is large when the output-current detection voltage (or the output current) is low, and decreases with the output-current detection voltage. In addition, the constant-voltage power supply unit allows enhance feedback of ac components in the feedback loop so as to enhance the ESR of the load-side capacitor, thereby securing phase compensation to prevent oscillations in the feedback loop.

17 Claims, 4 Drawing Sheets

CONSTANT-VOLTAGE POWER SUPPLY UNIT

FIELD OF THE INVENTION

This invention relates to a constant-voltage power supply unit having a high-speed load response characteristic and fold-back type over-current protection function.

BACKGROUND OF THE INVENTION

There have been used constant-voltage power supply units for providing a predetermined constant voltage by controlling a dc input voltage by means of a primary control transistor. Such constant-voltage power supply unit has an error amplifier adapted to obtain the difference between the output voltage and a reference voltage, wherein the primary control transistor is controlled on the basis of the difference such that the output voltage remains at the predetermined constant voltage. The voltage supply unit may have an over-current protection function for suppressing below a predetermined level an over-current caused by, for example, malfunctions of a load. Japanese Patent Early Publication No.2002-304225 discloses an over-current protection function characterized by not only a current drooping characteristic but also a so-called fold-back characteristic for reducing the output current in the event the output voltage has dropped.

Since a constant-voltage power supply unit has a fold-back type over-current protection function adapted to provide a predetermined constant voltage when the output current is within allowable limits and reduce the output current along with the output voltage (over-current protection mode) when the output current has reached a maximum allowed level, the unit can advantageously minimize energy loss while operating in the over-current protection mode.

It is necessary for the fold-back type over-current protection function to determine a proper protective current level independently of ambient temperature and use conditions, set a minimum allowable current level in the over-current protection mode, and provide a predetermined offset to secure a normal startup of the power supply unit as needed.

In conventional constant-voltage power supply units, the offset level is determined based on the potential drop across a resistor or a diode, which is, however, greatly influenced by ambient temperature and use condition. As a consequence, it is difficult to properly determine and set a protective current level. Moreover, extra power consumption is inevitable during the over-current protection mode, since the permissible current level in the over-current protection mode must allow for an extra margin.

In recent years, a ceramic capacitor has been increasingly used as a smoothing capacitor connected on the load side of the output terminal of the power supply unit, because a ceramic capacitor has not only good reliability and durability but also a larger capacity per unit volume than other capacitor such as a tantalum capacitor and an electrolytic capacitor, which enable production of a miniaturized yet lugged capacitor. As a consequence, following a recent trend of miniaturization and energy saving policy on electric devices, most of capacitors used in the electric devices are ceramic capacitors such as lamination type capacitors. However, ceramic capacitor has a disadvantage that its equivalent series resistance (ESR) is remarkably small as compared with that of a tantalum capacitor and an electrolytic capacitor.

From an energy saving point of view, it is preferable for the capacitor to have a small ESR since small ESR implies small energy consumption. However, in performing high-speed voltage feedback of a constant-voltage power supply unit, it is difficult to acquire a sufficiently large feedback signal for ac components if the ESR is small, though necessary for phase compensation. Moreover, if the amplification of the relevant feedback loop is stepped up to amplify the feedback signal, a new problem arises in that the control loop becomes more likely to suffer oscillations.

SUMMARY OF THE INVENTION

It is therefore an object of the invention to provide a constant-voltage power supply unit having a fast load-response characteristic, equipped with a fold-back type over-current protection function, the power supply unit capable of:

properly determining a predetermined protective current level independently of ambient temperature and use condition;

maintaining a low current level in an over-current protection mode of operation; and providing a sufficient offset for securing proper startup of the power supply unit.

It is another object of the invention to provide a constant-voltage power supply unit having a fast load-response characteristic, equipped with a fold-back type over-current protection function, the power supply unit comprising a feedback loop capable of acquiring a sufficiently large ac feedback signal to make phase compensation to prevent oscillations in the loop.

It is still another object of the invention to provide a constant-voltage power supply unit having a fold-back type over-current protection function, the power supply unit capable of operating at a high speed at a low power consumption rate.

In accordance with one aspect of the invention, there is provided a constant-voltage power supply unit, comprising:

an output circuit that includes a primary control transistor circuit having a conductivity controlled by an output-controlling signal and adapted to convert a source voltage to a predetermined output voltage, thereby providing the predetermined output voltage along with an output current and a voltage detection circuit for generating a feedback voltage in accord with the output voltage;

a current detection circuit for generating a detection voltage in accord with the output current (the detection voltage referred to as output current detection voltage);

a voltage control circuit for comparing the feedback voltage with a reference voltage and for generating a voltage control signal in accord with the difference between the feedback voltage and reference voltage, the voltage control signal serving as a basis of the output-controlling signal; and an over-current limiting circuit adapted to compare the sum of the feedback voltage and offset voltage (the sum hereinafter referred to as sum voltage) with the output current detection voltage, and, when the output current detection voltage exceeds the sum voltage, control the voltage control signal so as to bring the primary control transistor circuit towards its turn-off state, thereby reducing the output voltage and output current, wherein the output voltage is large when the output current detection voltage is small, but becomes smaller as the output current detection voltage becomes larger.

The over-current limiting circuit may include a differential circuit consisting of:

a series circuit of a feedback MOS transistor and an offsetting MOS transistor, the feedback MOS transistor having a gate receiving the feedback voltage, and the offsetting MOS transistor having a gate coupled to a predetermined potential and generating across the opposite ends thereof the offset voltage; and a MOS transistor receiving at the gate thereof the output current detection voltage (the MOS transistor hereinafter referred to as detection voltage receiving MOS transistor).

The voltage control circuit may include:

a series circuit of a voltage controlling MOS transistor and a current source circuit; and an error amplifier for comparing the reference voltage with the feedback voltage and impressing the difference voltage obtained by the comparison on the gate of the voltage controlling MOS transistor, the voltage controlling circuit adapted to provide the voltage control signal at the node of the voltage controlling MOS transistor and current source circuit.

The voltage detection circuit may include:

a resistive voltage-dividing circuit for dividing the output voltage of the primary control transistor circuit to provide at the voltage dividing node thereof the feedback voltage;

a secondary control transistor circuit having its conductivity controlled by the output-controlling signal;

a feedback regulation circuit connected between the output end of the primary control transistor circuit and the output end of the secondary control transistor circuit; and a first feedback capacitor connected between the output end of the secondary control transistor circuit and the voltage dividing node.

The constant-voltage power supply unit may further comprise a second feedback capacitor connected in parallel with the voltage dividing resistor that is connected to the output end of the primary control transistor circuit.

The feedback regulation circuit may include variable resistor means having a small resistance when the output current detection voltage is large, but having a large resistance when the output current detection voltage is small, the variable resistor means controlled based on the output current detection voltage.

The variable resistor means may comprise a MOS transistor controlled based on the output current detection voltage.

The feedback regulation circuit may comprise a resistor having a regulated resistance.

The current detection circuit may comprise a series circuit consisting of a current detection transistor circuit having its conductivity controlled by the output-controlling signal and a current detecting resistor, wherein the current detection circuit outputting the output-current detection voltage in accord with the current flowing through the current detecting resistor.

The constant-voltage power supply unit may further comprise a current amplification circuit stage between the output end of the voltage control circuit and the gate of the primary control transistor circuit, the current amplification circuit stage having a bipolar transistor for converting the voltage control signal into the output-controlling signal.

In the inventive constant-voltage power supply unit, each transistor of the primary control transistor circuit, secondary control transistor circuit, and current detection transistor circuit may be a P-type MOS transistor or a PNP-type bipolar transistor.

In the inventive constant-voltage power supply unit equipped with the fold-back type over-current protection function as described above, the sum of the feedback voltage and the offset voltage is compared with the output current detection voltage, wherein the offset voltage is inversely proportional to the output-current detection voltage, so that the offset voltage is large when the output-current detection voltage (or the output current) is small, but decreases with the output-current detection voltage. Accordingly, the predetermined current level may be properly determined independently of ambient temperature and use condition. Further, the output current can be maintained at a low level during an over-current protection mode of operation. In addition, a sufficient offset is provided to secure a proper startup.

It is noted that the inventive over-current limiting circuit includes a differential circuit consisting of a detection voltage receiving MOS transistor having a gate receiving the output current detection voltage and a series circuit of a feedback MOS transistor having a gate receiving a feedback voltage and an offsetting MOS transistor having a gate coupled to a predetermined potential, and generating across the opposite ends thereof an offset voltage. As a result, the offset voltage may be securely and automatically set to an appropriate level by simple means.

It should be appreciated that the inventive constant-voltage power supply unit feeds back the voltage that is proportional to the output current supplied from a secondary control transistor circuit, through a feedback regulation circuit and the first feedback capacitor, so that it is possible to amply feedback ac components. Thus, phase compensation for preventing oscillations in the feedback loop can be secured even when a ceramic capacitor having a small ESR is connected to the output terminal of the unit. As a result, a faster feedback loop can be implemented. Further, the implementation is facilitated by a current amplification circuit stage that is constructed using high-speed bipolar transistor circuits.

Since the resistance of the feedback regulation circuit is automatically varied according to the magnitude of the output current, proper phase compensation is attained.

It will be appreciated that in the inventive constant-voltage power supply unit the voltage control signal from the voltage control circuit is amplified and converted into the output-controlling signal by a current amplification circuit stage that utilizes bipolar transistors before the signal is supplied to the primary control transistor circuit. Accordingly, the power supply unit attains still faster operability.

DETAILED DESCRIPTION OF THE PREFERRED EMBODIMENT

Figure 1:
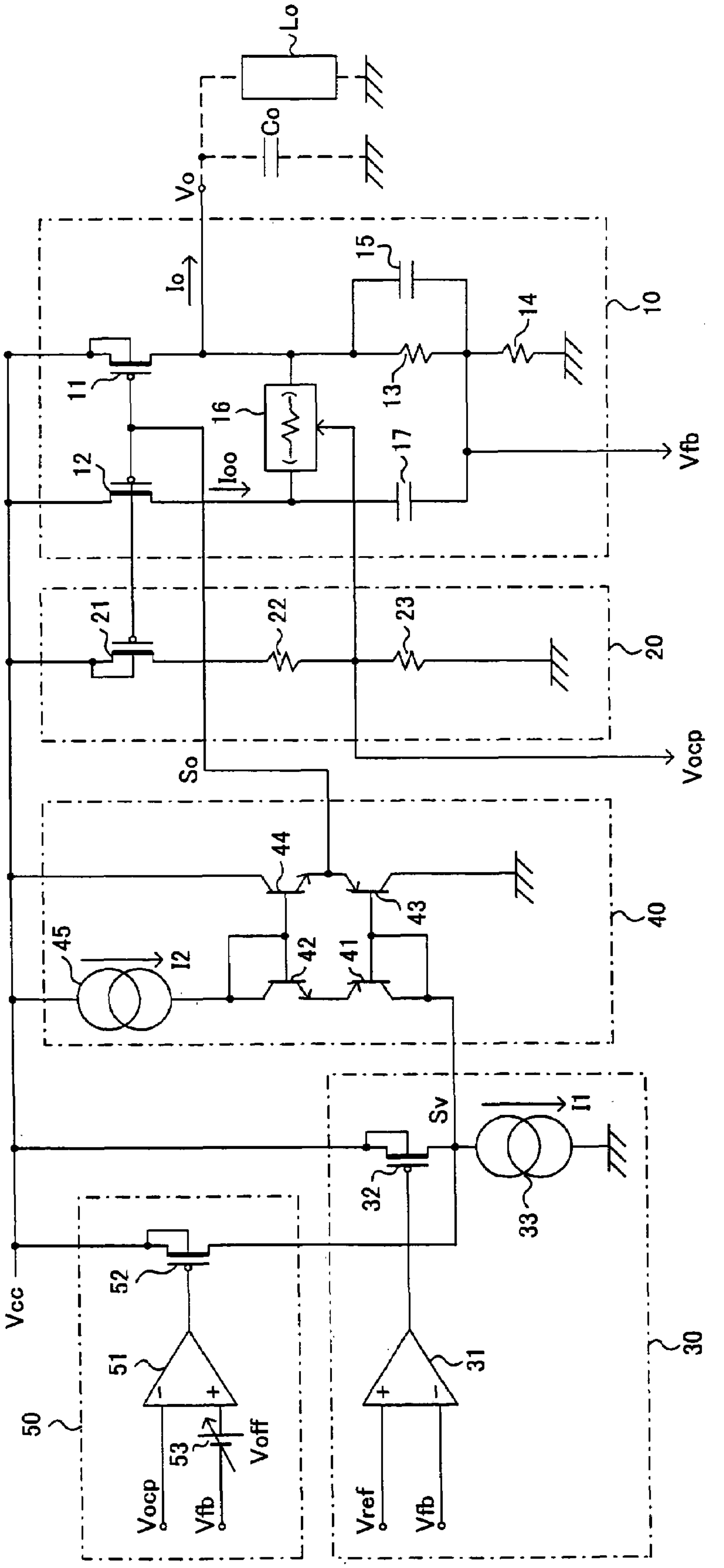
FIG. 1 is a circuit diagram of a constant-voltage power supply unit according to one embodiment of the invention.
Figure 2:
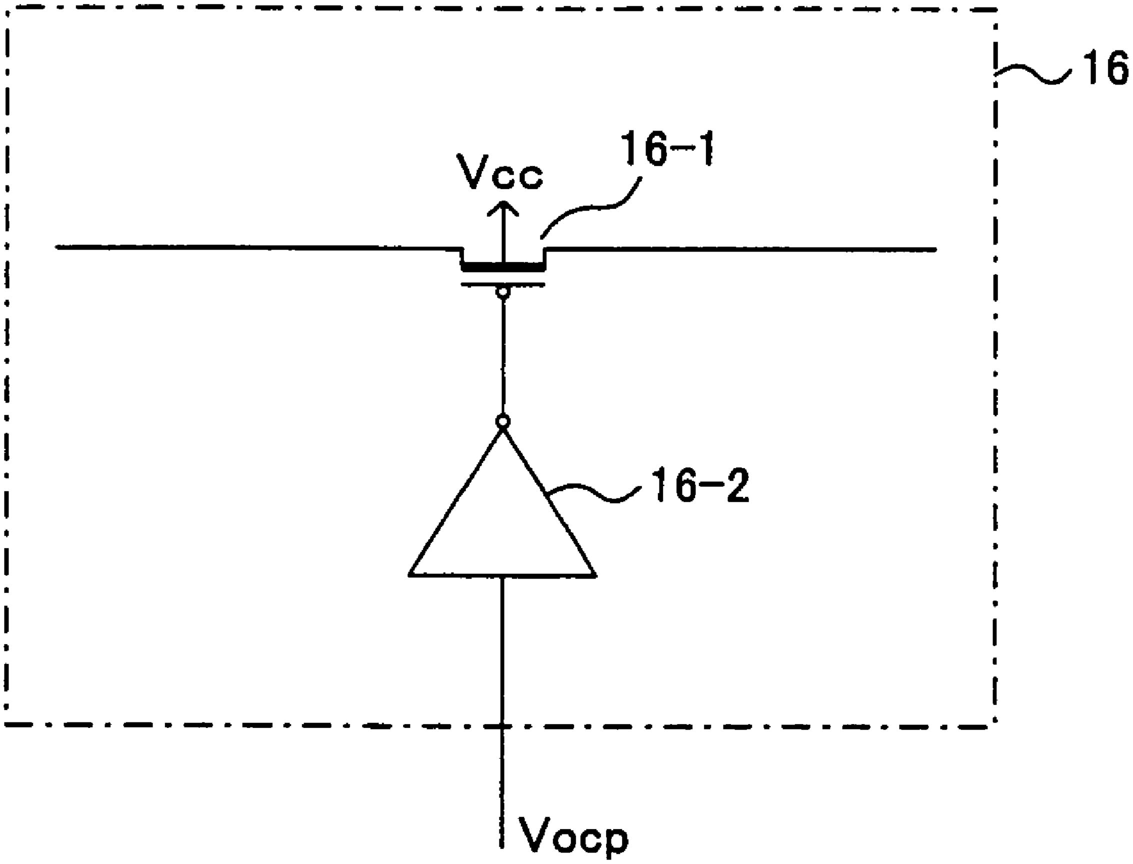
FIG. 2 shows a circuit of the feedback regulation circuit of FIG. 1.
Figure 3:
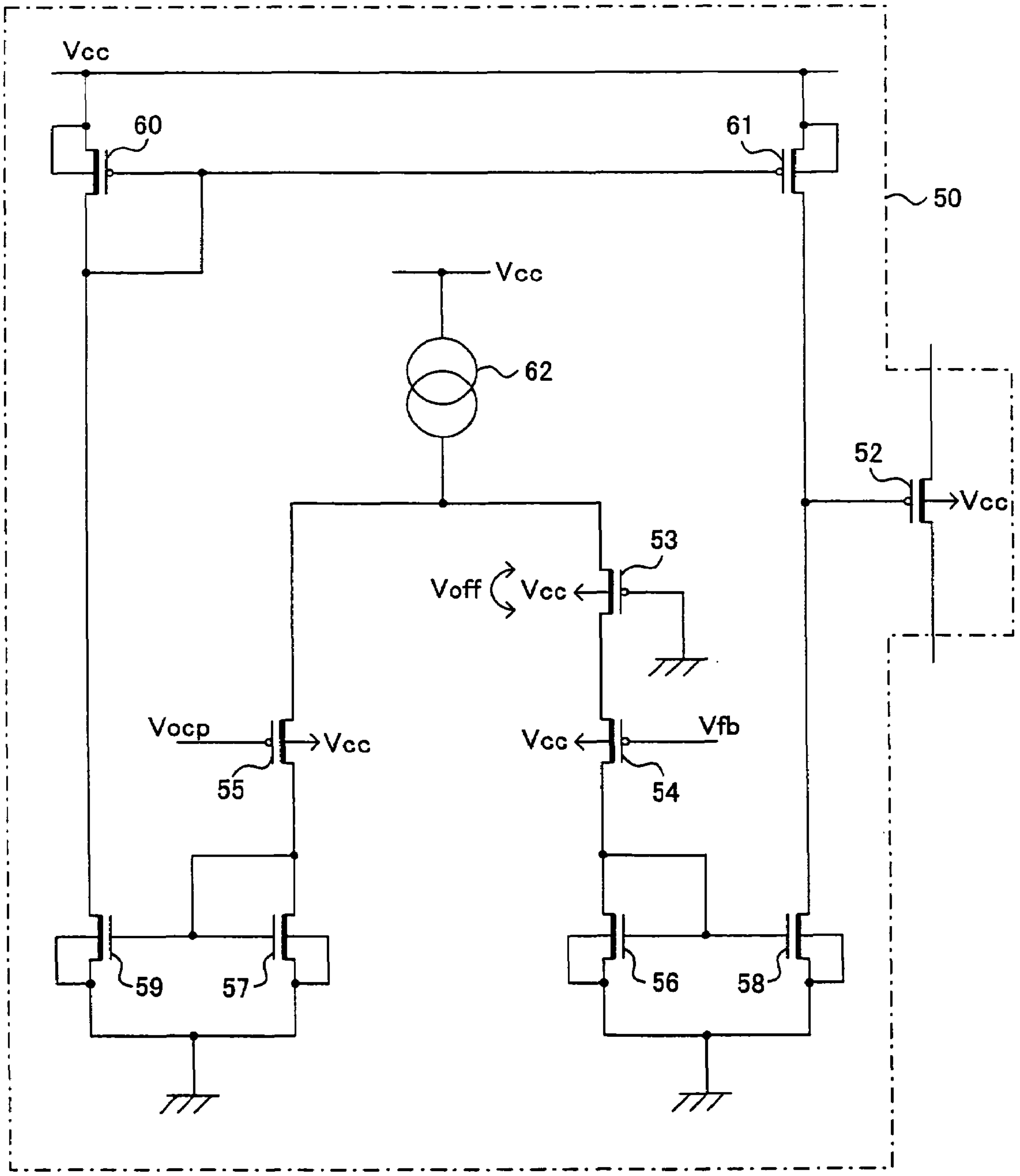
FIG. 3 shows a specific example of the over-current limiting circuit of FIG. 1.
Figure 4:
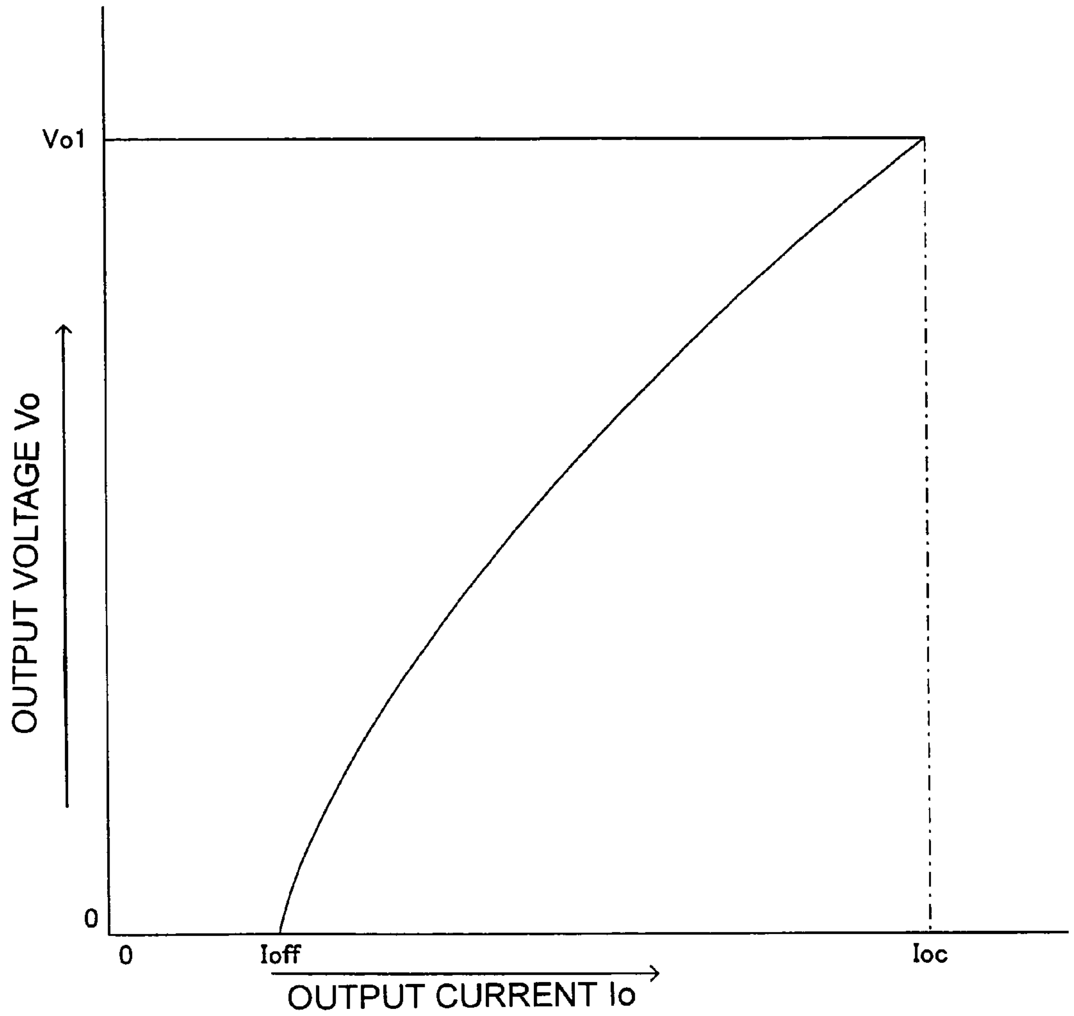
FIG. 4 is a graph illustrating the fold-back type over-current protection characteristic according to the invention.

The inventive constant-voltage power supply unit will now be described by way of example with reference to the accompanying drawings. FIG. 1 is a circuit diagram of a constant-voltage power supply unit according to one embodiment of the invention, FIG. 2 shows a circuit of the feedback regulation circuit, FIG. 3 shows a specific example of the over-current limiting circuit, and FIG. 4 is a graph illustrating the fold-back type over-current protection characteristic according to the invention.

Referring to FIG. 1, there is shown an output circuit 10, in which a P-type MOS transistor 11, serving as a primary control transistor circuit, is controlled by an output-controlling signal So so as to convert a source voltage Vcc into a predetermined output voltage Vo. The output voltage Vo is supplied to external components. The external components include a load Lo and a smoothing capacitors Co, for example. In most cases, a ceramic capacitor is used as the smoothing capacitor Co.

The output circuit 10 is provided with a voltage detection circuit generating a feedback voltage Vfb in accord with the output voltage Vo. The voltage detection circuit is identified as the part of the output circuit 10 excluding the P-type MOS transistor 11.

The voltage detection circuit is constituted of: a resistive voltage-dividing circuit made up of resistors 13 and 14 for dividing the output voltage Vo at the output end of the P-type MOS transistor 11 to provide at the node of the resistors a feedback voltage Vfb; a P-type MOS transistor 12 serving as a secondary control transistor circuit having electrical conductivity controlled by the output-controlling signal So; a feedback regulation circuit 16 connected between the output end of the P-type MOS transistor 11 and the output end of the P-type MOS transistor 12; and a first feedback capacitor 17 connected between the output end of the P-type MOS transistor 12 and the node of the voltage-dividing resistors 13 and 14 of the resistive voltage-dividing circuit. A second feedback capacitor 15 may be connected in parallel with the voltage dividing resistor 13 connected to the output end of the P-type MOS transistor 11. The magnitude of the current flowing through the P-type MOS transistor 12 depends on the resistance of the feedback regulation circuit 16, which is normally about one part in a few hundreds of the current flowing through the P-type MOS transistor 11.

The feedback regulation circuit 16 includes a variable resistor means whose resistance is controlled based on the output-current detection voltage Vocp generated in accord with the output current Io. The variable resistor means preferably has a characteristic that its resistance is small when the output current detection voltage is large, and is large when the output current detection voltage is small. This variable resistor means can be formed using a MOS transistor, as shown in FIG. 2. In the example shown, the variable resistor means is a P-type MOS transistor 16-1, which can be controlled via an inverting amplifier 16-2, based on the output current detection voltage Vocp. The feedback regulation circuit 16 can be formed using a variable resistor. The resistances of the voltage dividing resistors 13 and 14 are much larger as compared with the resistance of the feedback regulation circuit 16.

A current detection circuit 20 is provided to generate the output current detection voltage Vocp in accord with the output current Io. The current detection circuit 20 is constituted of a current detecting transistor circuit in the form of P-type MOS transistor 21 whose conductivity is controlled by the output-controlling signal So and a series circuit of current detecting resistors 22 and 23. The current detection circuit 20 outputs the output current detection voltage Vocp in accord with the current flowing through the current detecting resistor 23. The current detecting resistors can be replaced by a single resistor, e.g. resistor 23. Since the P-type MOS transistor 21 suffices to provide a current that is sufficient to generate the output current detection voltage Vocp in accord with the output current Io, the magnitude of the current that flows through transistor 21 can be about one part in a few thousands of the current flowing through the P-type MOS transistor 11. Incidentally, the current detection circuit 20 is not limited to the one shown in FIG. 1. The circuit 20 may have an alternative configuration in which the P-type MOS transistor 11 is connected in series with a current detecting resistor for directly detecting the output current Io.

A voltage control circuit 30 compares the feedback voltage Vfb with a reference voltage Vref to generate a voltage control signal Sv in accord with the difference between them. The voltage control signal Sv serves as the basis of the output-controlling signal So. The voltage control circuit 30 includes a series circuit of a P-type MOS transistor 32 (serving as a voltage controlling MOS transistor) and a current source circuit 33 providing current 11, and an error amplifier 31 for comparing the reference voltage Vref and the feedback voltage Vfb to generate the difference voltage between them, which is supplied to the gate of a P-type MOS transistor 32. The voltage control signal Sv is output from the node of the P-type MOS transistor 32 and the current source circuit 33. As an example, the reference voltage Vref is formed from the source voltage Vcc by a band-gap type constant-voltage circuit. The reference voltage Vref is a constant voltage associated with the target output voltage Vo.

A current amplification circuit stage 40 is fed the voltage control signal Sv received from the voltage control circuit 30. The voltage control signal Sv is amplified through current-amplification to form the output-controlling signal So, which is supplied to the gate of the P-type MOS transistor 11.

This current amplification circuit stage 40 is formed as a bipolar transistor circuit. In the current amplification circuit stage 40, a current source circuit 45 providing current I2 (I2<I1), an NPN type bipolar transistor (hereinafter referred to as NPN transistor) 42 having its collector connected to its base, and an PNP-type bipolar transistor (henceforth, PNP transistor) 41 having its base connected to its collector are connected between the source voltage Vcc and the output end of the voltage control circuit 30 in series in the order mentioned. Connected between the source voltage Vcc and the ground are an NPN transistor 44 having its base connected to the base of the NPN transistor 42, and a PNP transistor 43 having its base connected to the base of the PNP transistor 41, all connected in series in the order mentioned. The output-controlling signal So is taken out from the node of the NPN transistor 44 and the PNP transistor 43.

In general, when driving the P-type MOS transistor 11 (serving as the primary control transistor circuit) by, for example, a CMOS transistor circuit, its operational speed is usually slow. In order to increase this speed, it is necessary to drive the primary control transistor circuit with a larger current, which results in consumption of large current. However, in accordance with the invention, the P-type MOS transistor 11 can be driven at a high speed with only a little current consumption, owing to the current amplification circuit stage formed in the form of a bipolar transistor circuit.

An over-current limiting circuit 50 compares the output current detection voltage Vocp with the sum (Vfb+Voff) of the feedback voltage Vfb and an offset voltage Voff. The over-current limiting circuit 50 is adapted to control the voltage control signal Sv so as to bring the P-type MOS transistor 11 towards its turn-off state when the output current detection voltage Vocp exceeds the sum voltage (Vfb+Voff), to thereby decrease both the output voltage Vo and output current Io. The offset voltage Voff has a characteristic in that it is inversely proportional to the output current detection voltage, so that it is large when the output current detection voltage Vocp is small, and it becomes smaller as the output current detection voltage Vocp becomes larger.

The offset voltage Voff may be generated by an offset voltage generating means 53, which can be a P-type MOS transistor (referred to as offsetting P-type MOS transistor). The sum voltage (Vfb+Voff) and the output current detection voltage Vocp are respectively input into the positive (+) and negative (−) input terminals of a voltage comparator 51. The comparison output of the voltage comparator 51 is impressed on the gate of the P-type MOS transistor 52. Since the P-type MOS transistor 52 is connected between the source voltage Vcc and the output end of the voltage control circuit 30, the voltage control signal Sv will be controlled by the output of the over-current limiting circuit 50.

Referring to FIG. 3, there is shown an exemplary circuit structure of the over-current limiting circuit 50. As shown in FIG. 3, the over-current limiting circuit 50 has a differential circuit consisting of a voltage detecting P-type MOS transistor 55 having a gate coupled to the output current detection voltage Vocp and a series circuit of a P-type feedback MOS transistor 54 having a gated coupled to the feedback voltage Vfb and a MOS transistor 53 having a gate coupled to a predetermine potential (which is the ground potential in the example shown) for generating across the opposite ends thereof the offset voltage.

The offsetting MOS transistor 53 and the detection voltage receiving P-type MOS transistor 55, connected together at their ends, are further connected to the source voltage Vcc via a circuit source circuit 62. One end of the feedback MOS transistor 54 is connected with the other end of the offsetting MOS transistor 53. The other end of the feedback MOS transistor 54 is connected to the ground via an N-type MOS transistor 56 having its drain and gate connected together. The other end of the voltage detecting MOS transistor 55 is connected to the ground via an N-type MOS transistor 57 having its drain and gate connected together.

It should be understood that the primary control transistor circuit 11, secondary control transistor circuit 12, and current detection transistor circuit 21 may alternatively be formed using PNP-type transistors instead of P-type transistors. In this way, by the use of P-type MOS transistors or PNP-type transistors in the primary control transistor circuit 11, a low-saturation regulator type constant-voltage power supply unit can be constructed.

Connected also between the source voltage Vcc and the ground are a P-type MOS transistor 60 having its gate and drain connected together and an N-type MOS transistor 59 having its gate connected to the gate of the N-type MOS transistor 57 in the order mentioned. Also connected in series between the source voltage Vcc and the ground are, a P-type MOS transistor 61 having its a connected to the gate of the P-type MOS transistor 60, and an N-type MOS transistor 58 having a gate connected to the gate of the N-type MOS transistor 56, in the order mentioned, with the node of the MOS transistors 61 and 58 connected to the gate of a P-type MOS transistor 52.

Operation of the inventive constant-voltage power supply unit will now be described with reference to FIGS. 1–4.

Under normal operating condition, differential output of the error amplifier 31 indicative of the difference between the reference voltage Vref and the feedback voltage Vfb is supplied to the gate of the P-type MOS transistor 32. As a result, the voltage control signal Sv in accord with the differential output is output from the voltage control circuit 30. This voltage control signal Sv is amplified by the current amplification circuit stage 40, and is output therefrom as the controlling signal So. The output-controlling signal So is supplied to the gate of the P-type MOS transistors 11, 12, and 21.

Output from the P-type MOS transistor 11 is the output voltage Vo along with the current (which is substantially the output current Io) to meet the demand of the load. The output voltage Vo is controlled at a predetermined level Vo1 in accord with the reference voltage Vref.

From the P-type MOS transistor 12, current Ioo is output. This current has a magnitude in accord with the output-controlling signal So, and is supplied as a part of the output current Io, via the feedback regulation circuit 16. As a consequence, a voltage drop created across the feedback regulation circuit 16 amounts to the product of the resistance Rb of the feedback regulation circuit 16 and the current Ioo.

The output voltage Vo is a dc voltage superimposed with high-frequency ac components. This output voltage Vo is divided by the voltage dividing resistors 13 and 14 and the second feedback capacitor 15. The voltage appearing at the voltage dividing node is fed back to the error amplifier 31 as the feedback voltage Vfb.

In order to prevent oscillations that takes place in the control loop of the constant-voltage power supply unit, the second feedback capacitor 15 is provided to facilitate feedback of ac components of the output voltage Vo. However, when an external smoothing capacitor Co is a ceramic capacitor, its ESR is remarkably smaller than that of a tantalum capacitor and an electrolytic capacitor. For example, ESR of a ceramic capacitor is in the range of about 10 m Ohm to 50 m Ohm, as compared with ESR of a tantalum capacitor and electrolytic capacitor being in the range from 1 Ohm to about 10 Ohms. Then, because the capacitor Co absorbs a large portion of the ac components in the output voltage Vo, diminishing the ac components, ac components will not be sufficiently fed back if the feedback is done solely by the second feedback capacitor 15.

In the invention, the current Ioo from the P-type MOS transistor 12 is passed to the load via the feedback regulation circuit 16, which causes a voltage drop across the feedback regulation circuit 16, with the voltage drop being the resistance Rb times the current Ioo. This voltage drop is superposed on the output voltage Vo, generating a resultant voltage (referred to as superposition voltage) Voo (=Vo+Rb×Ioo). The superposition voltage Voo is supplied to voltage dividing node of the resistive voltage-dividing circuit via the first feedback capacitor 17.

As a result, the feedback voltage Vfb is superposed with the dc component obtained by the voltage division of the output voltage Vo plus the ac component contained in the superposition voltage Voo. This feedback voltage Vfb is fed back to the error amplifier 31. That is, regarding the feedback of ac components, ESR of the capacitor Co is substantially increased. Of course, the resistance of the capacitor Co itself does not actually increase, so that the energy loss by the capacitor Co still remains small.

Thus, in accordance with the invention, it is possible to secure phase compensation for oscillation prevention even when a ceramic capacitor Co connected to the output terminal of the power supply unit has a small ESR. Therefore, coupled with the current amplification circuit stage 40 configured in the form of a high-speed bipolar transistor circuit, the feedback loop can provide a still faster and secure feedback.

As shown in FIG. 2, the feedback regulation circuit 16 is configured to include variable resistor means 16-1 controlled on the basis of the output current detection voltage Vocp. Preferably, the variable resistor means 16-1 has a characteristic that its resistance is small when the output current detection voltage Vcop is large, and becomes larger when the output current detection voltage Vcop becomes smaller. Specifically, the P-type MOS transistor can be a variable resistor means 16-1, which can be controlled by the output of the inverting amplifier 16-2 receiving the output current detection voltage Vcop.

It will be appreciated that use of variable resistor means 16-1 as the feedback regulation circuit 16 enables variable control of the resistance of the feedback regulation circuit 16 according to the magnitude of the load (or output current). That is, the ESR of the load-side capacitor can be substantially changed. This adds more degrees of freedom to the design of phase compensation circuit.

In a case where the feedback regulation circuit 16 has a large fixed resistance, the P-type MOS transistor 12 working as the secondary control transistor circuit in a mirror configuration may become inoperable when the P-type MOS transistor 11 working as the primary control transistor circuit is saturated under a heavy load. In such a case, the control loop may undergo oscillations due to the fact that the feedback regulation circuit 16 itself loses its function. However, this is not the case in the invention, since the variable resistor means 16-1 is used as a feedback regulation circuit 16, so that, under a heavy load, the feedback regulation circuit 16 is automatically controlled to have a small resistance, thereby maintaining oscillation prevention functionality.

Alternatively, a resistor having a regulated resistance may be used as the feedback regulation circuit 16. In this case, the resistance of the variable resistor means 16-1 may be set to the medium between the two limits set up for the heaviest and lightest loads. It will be appreciated that even when the feedback regulation circuit 16 is a regulated resistor, feedback of ac components is enhanced to a greater degree than in conventional feedback systems, thereby securing sufficient phase compensation for prevention of oscillations.

Next, a protection mode of operation of the inventive power supply unit under an over-current condition will now be described. The inventive constant-voltage power supply unit having a fold-back type over-current protection function provides an output voltage Vo maintained at a constant voltage Vo1 when the output current is less than a predetermined current level Ioc, as shown in FIG. 4.

In the event that the output current Io has exceeded the predetermined protective current level Ioc due to a load failure for example, the power supply unit enters the over-current protection mode, in which the output current Io will be constrained by the fold-back over-current protection function to fall below the protective current level Ioc together with the output voltage Vo. In the over-current protection mode, a predetermined small continuing current Ioff will be allowed to flow after the output voltage Vo has diminished to zero voltage.

In the design of a fold-back type over-current protection function, it is important to configure the function to work at a given protective current level Ioc independently of ambient temperature, and that the continuing current level Ioff during the over-current protection mode be set as low as possible. Moreover, in connection with the continuing current level Ioff, in order to ensure proper startup for the constant-voltage power supply unit, it is necessary to set up a minimum non-zero offset voltage in the feedback loop.

In the over-current limiting circuit 50 operating under normal operating condition, the feedback voltage Vfb is large in accord with the constant voltage Vo1, while the output current detection voltage Vocp is small. Hence, when compared with the sum voltage (Vfb+Voff) of the feedback voltage Vfb and offset voltage Voffm, the output current detection voltage Vocp is small. Accordingly, during a normal operation, the gate of the P-type MOS transistor 52 is impressed with a large voltage, thereby performing no over-current protection operation.

This offset voltage Voff is determined by the gate-source voltage Vgs of the offsetting MOS transistor 53 (i.e. potential difference Vgs between the gate (held at the ground potential) and the node of one end of the offsetting MOS transistor 53 and one end of the detection voltage receiving MOS transistor 55). This arrangement ensures that the offset voltage is large when the output current detection voltage Vocp impressed on the gate of the detection voltage receiving MOS transistor 55 is small, and conversely the offset voltage is small when the voltage Vocp becomes high.

As the output current Io becomes larger, approaching the protective current level Ioc, the output current detection voltage Vocp is increased accordingly. Then the offset voltage Voff decreases substantially to 0 V. Since the offset voltage Voff is negligibly small at this stage, it will be henceforth regarded as 0V in the description below.

The over-current protection function is configured in such a way that the output current detection voltage Vocp exceeds the feedback voltage Vfb when the output current Io has reached the protective current level Ioc. In other words, when the output current Io has reached the protective current level Ioc, the output current detection voltage Vocp exceeds the feedback voltage Vfb to cause the P-type MOS transistor 52 to become conductive.

As the P-type MOS transistor 52 becomes conductive, the current flowing from the current amplification circuit stage 40 to the current source circuit 33 is decreased by the same amount as the current flowing through the P-type MOS transistor 52. As a result, the output-controlling signal So grows higher, while the output voltage Vo is lowered and the output current Io is reduced. That is, the output voltage Vo decreases from the constant voltage Vo1 towards 0 V as shown in FIG. 4, while the output current Io decreases from the protective current level Ioc towards the continuing current level Ioff.

The gate-source voltage Vgs of the MOS transistor 53 is lowered together with the output current Io, since the output current detection voltage Vocp decreases. As the voltage Vgs is lowered, the source-drain voltage Vds of the offsetting MOS transistor 53, i.e. offset voltage Voff, increases accordingly. The continuing current level Ioff is determined based on the value of the offset voltage Voff when the output voltage Vo has dropped to 0 V.

Thus, in the invention, when the output current detection voltage Iocp (namely, output current Io) is low, the offset voltage Voff is large, but decreases when the output current detection voltage Iocp increases. Therefore, the output current Io is strictly limited by the protective current level Ioc, and maintained at a small continuing current level Ioff in an over-current protection mode of operation.

The offset voltage Voff plays an important role in ensuring a healthy startup of the inventive constant-voltage power supply unit.

To understand this point, it is noted that without the offset voltage Voff both of the feedback voltage Vfb and the output current detection voltage Vocp are zero, and hence the difference voltage, so that the voltage comparator 51 might suffer instability that leads to a startup failure. In the invention, however, a predetermined offset voltage Voff is secured by the offset voltage generating means 53 at the time of startup, thereby securely starting up the power supply unit.

What I claim is:

1. A constant-voltage power supply unit, comprising:

an output circuit that includes a primary control transistor circuit having a conductivity controlled by an output-controlling signal and adapted to convert a source voltage to a predetermined output voltage, thereby providing said predetermined output voltage along with an output current, and a voltage detection circuit for generating a feedback voltage in accord with said output voltage;

a current detection circuit for generating an output current detection voltage in accord with said output current;

a voltage control circuit for comparing said feedback voltage with a reference voltage and for generating a voltage control signal in accord with the difference between said feedback voltage and reference voltage, said voltage control signal serving as a basis of said output-controlling signal; and an over-current limiting circuit adapted to compare the sum voltage of said feedback voltage and offset voltage with said output current detection voltage, and, when said output current detection voltage exceeds said sum voltage, control said voltage control signal so as to bring said primary control transistor circuit towards its turned-off state, thereby reducing said output voltage and output current, wherein said offset voltage is large when said output current detection voltage is small but becomes smaller as said output current detection voltage becomes larger.

2. The constant voltage power supply unit according to claim 1, wherein said over-current limiting circuit has a differential circuit consisting of:

a series circuit of a feedback MOS transistor and an offsetting MOS transistor, said feedback MOS transistor having a gate receiving said feedback voltage, and said offsetting MOS transistor having a gate coupled to a predetermined potential and generating across the opposite ends thereof said offset voltage; and a detection voltage receiving MOS transistor receiving at the gate thereof said output current detection voltage.

3. The constant voltage power supply unit according to claim 2, wherein said voltage detection circuit includes:

a resistive voltage-dividing circuit for dividing the output voltage of said primary control transistor circuit to provide at the voltage dividing node thereof said feedback voltage;

a secondary control transistor circuit having its conductivity controlled by said output controlling signal;

a feedback regulation circuit connected between the output end of said primary control transistor circuit and the output end of said secondary control transistor circuit; and a first feedback capacitor connected between the output end of said secondary control transistor circuit and said voltage dividing node.

4. The constant voltage power supply unit according to claim 3, further comprising a second feedback capacitor connected in parallel with the voltage dividing resistor that is connected to the output end of said primary control transistor circuit.

5. The constant voltage power supply unit according to claim 1, wherein said voltage control circuit includes:

a series circuit of a voltage controlling MOS transistor and a current source circuit; and an error amplifier for comparing said reference voltage with said feedback voltage and impressing the difference voltage obtained by the comparison on the gate of said voltage controlling MOS transistor, said voltage controlling circuit adapted to provide said voltage control signal at the node of said voltage controlling MOS transistor and current source circuit.

6. The constant voltage power supply unit according to claim 5, wherein said voltage detection circuit includes:

a resistive voltage-dividing circuit for dividing the output voltage of said primary control transistor circuit to provide at the voltage dividing node thereof said feedback voltage;

a secondary control transistor circuit having its conductivity controlled by said output controlling signal;

a feedback regulation circuit connected between the output end of said primary control transistor circuit and the output end of said secondary control transistor circuit; and a first feedback capacitor connected between the output end of said secondary control transistor circuit and said voltage dividing node.

7. The constant voltage power supply unit according to claim 6, further comprising a second feedback capacitor connected in parallel with the voltage dividing resistor that is connected to the output end of said primary control transistor circuit.

8. The constant voltage power supply unit according to claim 1, wherein said voltage detection circuit includes:

a resistive voltage-dividing circuit for dividing the output voltage of said primary control transistor circuit to provide at the voltage dividing node thereof said feedback voltage;

a secondary control transistor circuit having its conductivity controlled by said output controlling signal;

a feedback regulation circuit connected between the output end of said primary control transistor circuit and the output end of said secondary control transistor circuit; and a first feedback capacitor connected between the output end of said secondary control transistor circuit and said voltage dividing node.

9. The constant voltage power supply unit according to claim 8, further comprising a second feedback capacitor connected in parallel with the voltage dividing resistor that is connected to the output end of said primary control transistor circuit.

10. The constant voltage power supply unit according to claim 9, wherein said feedback regulation circuit includes variable resistor means having a small resistance when said output current detection voltage is large, but having a large resistance when said output current detection voltage is small, said variable resistor means controlled based on said output current detection voltage.

11. The constant voltage power supply unit according to claim 10, wherein said variable resistor means comprises a MOS transistor controlled based on said output current detection voltage.

12. The constant voltage power supply unit according to claim 9, wherein said feedback regulation circuit comprises a resistor having a regulated resistance.

13. The constant voltage power supply unit according to claim 8, wherein said feedback regulation circuit includes variable resistor means having a small resistance when said output current detection voltage is large, but having a large resistance when said output current detection voltage is small, said variable resistor means controlled based on said output current detection voltage.

14. The constant voltage power supply unit according to claim 13, wherein said variable resistor means comprises a MOS transistor controlled based on said output current detection voltage.

15. The constant voltage power supply unit according to claim 8, wherein said feedback regulation circuit comprises a resistor having a regulated resistance.

16. The constant voltage power supply unit according to claim 1, wherein said current detection circuit comprises a series circuit of a current detection transistor circuit having its conductivity controlled by said output controlling signal and a current detecting resistor, said current detection circuit outputting said output-current detection voltage in accord with the current flowing through said current detecting resistor.

17. The constant voltage power supply unit according to claim 1, further comprising a current amplification circuit stage between the output end of said voltage control circuit and the gate of said primary control transistor circuit, said current amplification circuit stage having a bipolar transistor for converting said voltage controlling signal into said output controlling signal.

* * * * *